April 25, 1950   W. F. AMON, JR ET AL   2,505,085
LIGHT-POLARIZING, MOLECULARLY ORIENTED, TRANSPARENT,
HIGH POLYMERIC PLASTIC CONTAINING DICHROIC
DITHIOOXAMIDE STAIN
Filed Sept. 25, 1947

COPPER DITHIO OXAMIDE in Poly Vinyl Alcohol

NICKEL DITHIO OXAMIDE in 6x stretched Poly Vinyl Alcohol

Patented Apr. 25, 1950

2,505,085

UNITED STATES PATENT OFFICE 2,505,085

LIGHT-POLARIZING, MOLECULARLY ORIENTED, TRANSPARENT, HIGH POLYMERIC PLASTIC CONTAINING DICHROIC DITHIOOXAMIDE STAIN

William F. Amon, Jr., Boston, and Marshall W. Kane, Cambridge, Mass., assignors to Polaroid Corporation, Cambridge, Mass., a corporation of Delaware Application September 25, 1947, Serial No. 776,110

6 Claims. (Cl. 88—65)

This invention relates to new and improved light polarizers and more specifically to a sheet-like light polarizer comprising a chelate type of compound incorporated in molecularly oriented linear high polymeric plastic.

An object of the invention is to provide a highly stabilized polarizing sheet material comprising a molecularly oriented transparent linear high polymeric plastic such, for example, as a vinyl compound such as polyvinyl alcohol or polyvinyl butyral, or a cellulosic compound such as regenerated cellulose, or a nylon stained with a metallic chelate such, for example, as a nickel or a copper chelate, and to provide such a light-polarizing sheet which is free from shrinkage, highly stable to heat and which possesses a number of other improved characteristics.

The invention accordingly comprises the product possessing the features, properties and the relation of components which are exemplified in the following detailed disclosure, and the scope of the application of which will be indicated in the claims.

Figure 1:
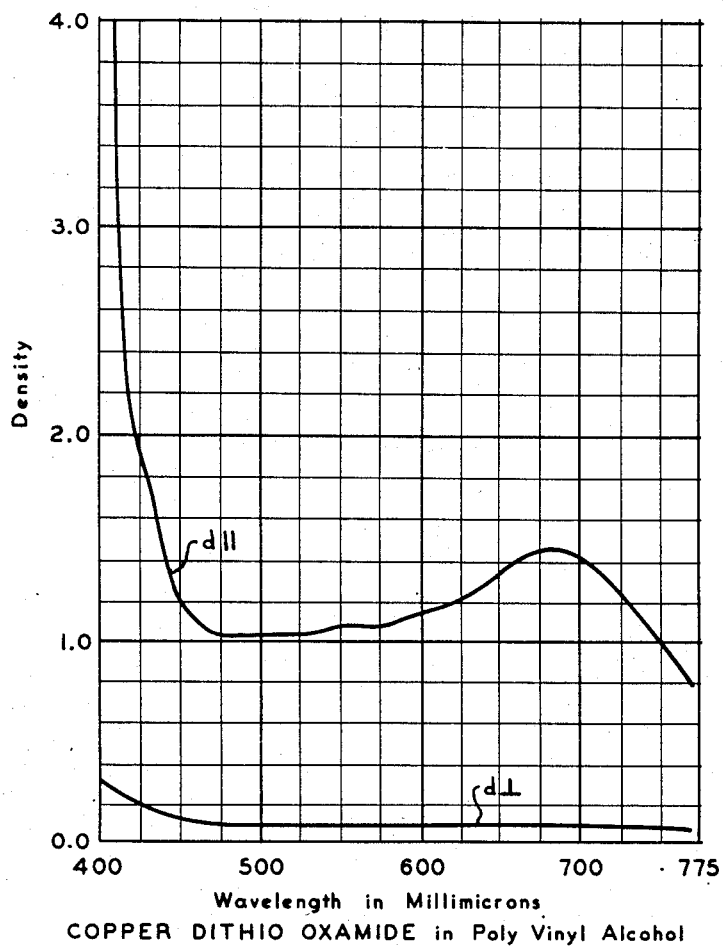
Figure 2:
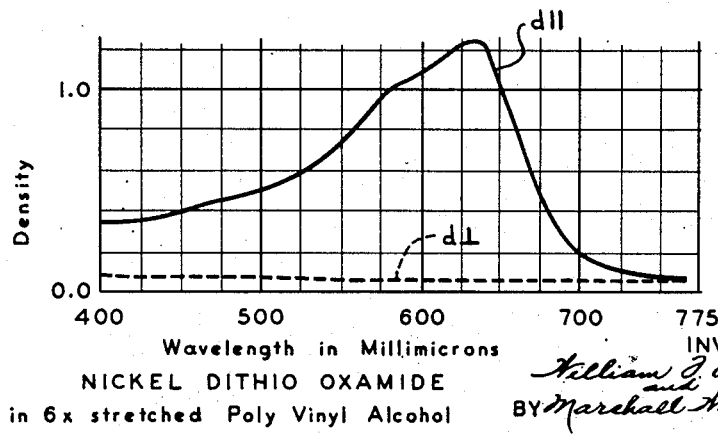

For a fuller understanding of the invention reference should be had to the accompanying drawing wherein:

Figure 1 is a graph wherein density is plotted against wave length in millimicrons for the two components $(d_{||}/d\perp)$ of a beam of light transmitted by a polarizer of the present invention comprising a stain or complex of copper dithiooxamide on molecularly oriented solid polyvinyl alcohol; and Fig. 2 is a similar graph illustrative of the density curves obtained from a stain of nickel dithiooxamide on molecularly oriented solid polyvinyl alcohol.

As will be apparent, the products of the present invention may possess high dichroic ratios, for example ratios of from 15 to 1 or 25 to 1 or higher, and light-polarizing materials possessing such high dichroic ratios and the heat stability of the light polarizers of the present invention are widely useful in the art.

In the process of the present invention a chelate and more specifically a chelate reaction product of a metal such as nickel or copper or a mixture of such chelate reaction products may be incorporated in a sheet or film of a synthetic linear high polymer, and more specifically transparent linear high polymeric plastics the molecules of which contain OH groups, for example, regenerated cellulose or other cellulosic products, polyvinyl alcohol, polyvinyl butyral or other vinyl compounds or a nylon.

The plastic material forming the carrier and receiving the chelate stain may be extended under stress, in the case of the vinyl compounds to from 6 to 8 times its unstretched length, and in the case of the other materials until substanial molecular orientation is obtained, and in this condition the molecularly oriented plastic stained with the chelate compound is dichroic and highly heat stable.

The chelate may be incorporated in the carrier plastic in any one of a number of ways familiar to those versed in the art. For example, nickel or copper chelates of dithiooxamide may be formed in situ in the plastic carrier, for example in polyvinyl alcohol, and when so formed they yield on heating and stretching blue neutral and dull green polarizers, respectively, with dichroic ratios in the region of 20 to 1. The resultant stained films are haze free and exceptionally heat stable.

The following examples are specific illustrations of methods of practicing the invention and are not to be understood as limiting the scope thereof.

A sheet of cast polyvinyl alcohol, for example a sheet .005 inch thick, is imbibed in a 5% nickelous acetate solution in equal parts of methanol and water. The sheet is then wiped dry and imbibed in a dilute solution, for example 1% to 2% of dithiooxamide in 3 parts of methanol and 2 parts of water. The sheet is again wiped dry and is heated, for example to approximately 150° C., and stretched to orient substantially the molecules of the polyvinyl alcohol, for example to 6 times its original cast length. A highly effective light-polarizing sheet is obtained having properties illustrated in Fig. 2.

The polyvinyl alcohol may, if desired, be imbibed in the dithiooxamide solution before being imbibed in the nickelous acetate solution. A similarly effective light-polarizing sheet is obtained with this modification of the process.

The sheet of polyvinyl alcohol may, if desired, be heated and stretched after imbibition in the first solution, i. e., either the nickelous acetate or the dithiooxamide solution, and the stretched sheet may then be imbibed in the other solution to produce a similarly effective light polarizer, or the sheet may be stretched and its desired molecular orientation obtained before any imbibition and the polarizing stain may be formed in the stretched sheet by successive imbibition in the nickelous acetate and dithiooxamide solutions.

Any of the foregoing processes may be modified by the substitution of a 5% solution of cupric acetate in methanol and water for the nickelous acetate solution specified and by following the remaining steps to obtain the desired light-polarizing stain in the plastic carrier. Where cupric acetate is employed in the production of the chelate stain the light polarizer obtained with molecularly oriented polyvinyl alcohol possesses the optical properties shown in Fig. 1.

It will be apparent that the percentages specified in connection with the concentrations of the solut'ons employed are not critical. For example, satisfactory light polarizers have been obtained by employing weaker solutions of nickelous acetate or cupric acetate and those specified and, for example, 2% solutions of said materials, and by employing stronger solutions, for example solutions up to 10%, of nickelous acetate and cupric acetate. These stains formed in the molecularly oriented plastic sheets from solutions falling within the indicated range of concentrations will be designated in the specification and the claims as stains of low concentration. Moreover, mixtures of cupric acetate and nickelous acetate may be employed in the production of light polarizers of the present invention and in any of the processes heretofore specified. A preferred mixture comprises approximately 10% of cupric acetate and 90% of nickelous acetate of the same strength.

In the examples given the plastic carrier has been described as polyvinyl alcohol. It is to be understood that other linear high polymeric plastics may be employed, for example, polyvinyl acetal, polyvinyl butyral and other vinyl compounds, regenerated cellulose and other cellulosic compounds or nylons.

It will be understood, moreover, that the dichroic ratio obtained by staining the molecularly oriented carrier will depend to a considerable degree upon the degree of molecular orientation obtained in the plastic sheet. A preferred carrier is, for this reason, polyvinyl alcohol which may be more readily extended to a high degree of molecular orientation than may, for example, regenerated cellulose. While it is possible to obtain products of the present invention with dichroic ratios in the region of 20 to 1 or even higher, it is to be understood that such dichroic ratios are not essential. Satisfactory products have been obtained adapted for limited commercial uses with dichroic ratios in the neighborhood of 7 to 1, and such products are deemed to fall within the scope of the invention.

While the present invention has been described as comprising the reaction product of nickelous acetate or cupric acetate with dithiooxamide, it is to be understood that other soluble copper or nickel salts may be employed in producing the chelate stain. If, for example, nickel nitrate is employed heat effectuates color development and the heating step may be used at any time during the process.

The temperature employed in effecting the reaction is not critical. A satisfactory temperature range for use in the practice of the present invention is from 130° to 170° C. where the carrier is polyvinyl alcohol, and similar temperatures not destructive of the carrier sheet may be employed with the other plastics.

The products of this invention possess high resistance to heat, slow dimensional change on exposure to humidity, high stability to ultraviolet radiation, resistance to weathering and they are thin and haze free. Upon X-ray examination sheet polarizers of the present invention show no crystalline structure other than that which may be accounted for by the crystallinity of the carrier sheet. Accordingly, it is believed that the chelate is present in the carrier in the form of a dye or stain or sorption complex on the carrier and not as suspended crystalline particles.

Since certain changes may be made in the above product, and different embodiments of the invention could be made without departing from the scope thereof, it is intended that all matter contained in the above description or shown in the accompanying drawing shall be interpreted as illustrative and not in a limiting sense.

What is claimed is:

1. A light polarizer comprising a sheet of a molecularly oriented transparent linear high polymeric plastic having incorporated therein a molecularly oriented dichroic stain of low concentration, comprising a dithiooxamide from the class consisting of nickel dithiooxamide and copper dithiooxamide.

2. A light polarizer comprising a sheet of a molecularly oriented transparent linear high polymeric plastic having incorporated therein a molecularly oriented dichroic stain of low concentration, comprising nickel dithiooxamide.

3. A light polarizer comprising a sheet of a molecularly oriented transparent linear high polymeric plastic having incorporated therein a molecularly oriented dichroic stain of low concentration, comprising copper dithiooxamide.

4. A light polarizer comprising a sheet of molecularly oriented polyvinyl alcohol having incorporated therein a molecularly oriented stain of copper dithiooxamide, said stain being of low concentration.

5. A light polarizer comprising a sheet of molecularly oriented polyvinyl alcohol having incorporated therein a molecularly oriented stain of nickel dithiooxamide, said stain being of low concentration.

6. A light polarizer comprising a sheet of molecularly oriented polyvinyl alcohol having incorporated therein a molecularly oriented stain of copper dithiooxamide and nickel dithiooxamide, said stain being of low concentration.

WILLIAM F. AMON, JR.
MARSHALL W. KANE

REFERENCES CITED

The following references are of record in the file of this patent:

UNITED STATES PATENTS

| Number | Name | Date |
|---|---|---|
| 2,208,253 | Flenner et al. | July 16, 1940 |
| 2,237,567 | Land | Apr. 8, 1941 |
| 2,246,087 | Bailey et al. | June 17, 1941 |
| 2,287,235 | Flint et al. | June 23, 1942 |

FOREIGN PATENTS

| Number | Country | Date |
|---|---|---|
| 289,493 | Great Britain | Apr. 30, 1928 |